United States Patent Office 3,036,130
Patented May 22, 1962

3,036,130
MIXTURES OF NOVEL CONJUGATED POLYOXY-
ETHYLENE-POLYOXYPROPYLENE COMPOUNDS
Donald R. Jackson, Wyandotte, and Lester G. Lundsted,
Grosse Ile, Mich., assignors to Wyandotte Chemicals
Corporation, Wyandotte, Mich., a corporation of
Michigan
No Drawing. Filed Sept. 10, 1957, Ser. No. 683,025
8 Claims. (Cl. 260—584)

This invention relates to mixtures of novel conjugated polyoxyethylene-polyoxypropylene compounds. In a more specific aspect, this invention relates to new nonionic surface active agents and a method for preparing same wherein the new surface active agents are essentially mixtures of conjugated or "block" polymers of ethylene oxide and propylene oxide.

This application is a continuation-in-part of our application Serial No. 380,696, filed September 17, 1953, now abandoned.

Nonionic surface active agents composed of a water-insoluble or hydrophobic nucleus, such as a long hydrocarbon chain or an alkyl-substituted ring compound, e.g. nonylphenol, and a water-solubilizing polyoxyethylene chain are well known in the art. Such surface active agents have excellent properties for many uses, but a disadvantage in this class of materials lies in the inflexibility of the water-insoluble or hydrophobic portion of the molecule. Any alteration in properties attributable to the hydrophobic portion of the surfactant can only be accomplished by selecting a completely different water-insoluble compound with which to condense ethylene oxide. Frequently however, different uses of surfactants require varying surfactant properties which differ only in small increments for the best performance.

An important contribution to the art in this regard is represented by the disclosure of Jackson et al. in U.S. 2,677,700, issued on May 4, 1954. Jackson et al. disclosed new surfactant compositions which are exemplified by the mixtures obtained by sequentially condensing propylene oxide with a lower molecular weight reactive hydrogen compound having only a single reactive hydrogen atom, such as n-propanol, to produce a water-insoluble, hydrophobic polyoxypropylene glycol ether, and then condensing ethylene oxide with the polyoxypropylene glycol ether in an amount sufficient to solubilize the polyoxypropylene glycol ether and provide surface active properties. With the benefit of Jackson et al.'s disclosure, the art can obtain surface active agents with properties which can be widely varied since both the hydrophobic and hydrophilic portions of the molecule can be altered by simply controlling the amounts of propylene oxide and ethylene oxide used in preparing the compounds. The compositions disclosed by Jackson et al. have opened the door for applications of nonionic surfactants derived from alkylene oxides in uncounted ways because of the new flexibility in chemical and physical properties that has been afforded.

Room for further improvement still exists, however. Even with the flexibility of chemical and physical properties afforded by the compostions of Jackson et al. wherein propylene oxide is initially condensed with a low molecular weight reactive hydrogen compound, and ethylene oxide in a solubilizing amount is then condensed therewith, we have found that specific combinations of properties desirable in a surfactant could not be attained in the compositions of Jackson et al. Keeping in mind the extremely wide variety of functions that nonionic surfactants are called upon to serve, it can well be appreciated that new uses are encountered with increasing frequency wherein new combinations of properties are required. Particularly in the field of formulated detergent compositions, new combinations of such important properties as detergency, cloud point and foaming (or nonfoaming) are desired which are not obtainable in any specific composition of Jackson et al.

An object of this invention, therefore, is to provide mixtures of novel conjugated polyoxyethylene-polyoxypropylene compounds.

A further object is to provide new surface active agents derived from conjugated or "block" polymers of ethylene oxide and propylene oxide which have new combinations of surface active properties.

A still further object is to provide a new method for preparing surface active agents derived essentially from ethylene oxide and propylene oxide.

As was stated above, the surface active agents disclosed by Jackson et al. are prepared by initially condensing propylene oxide with a low molecular weight reactive hydrogen compound, such as n-propanol or n-butanol, so as to produce a hydrophobic polyoxypropylene glycol ether, and then condensing ethylene oxide with the hydrophobic polyoxypropylene glycol ether. We have discovered, however, that a completely new series of surface active agents, from the viewpoint of chemical and physical properties, can be obtained by reversing the order in which propylene oxide and ethylene oxide are employed in the compositions of Jackson et al. Surprisingly, it has been found that when exactly the same amounts of propylene oxide and ethylene oxide are employed in preparing the compositions of Jackson et al. and in preparing the compositions of this invention where the order of condensation of propylene oxide and ethylene oxide is reversed, the surface active properties obtained in the compositions of this invention are completely different. In general, we have found that the cloud point and foam height of the compositions of this invention are significantly lower than the cloud point and foam height of the Jackson et al. compositions when comparisons are made between compositions prepared with the same weight of the same materials but differing in the order in which the propylene oxide and ethylene oxide are condensed. Detergency tests of the two classes of surfactants show varying results, but in every case the detergency of the composition of this invention is significantly different from the detergency of the strictly comparable composition of Jackson et al.

Thus, it will be readily appreciated that a further advance in the surface active agent art is represented by the compositions of this invention since flexibility in chemical and physical properties is increased. Frequently, success or failure in the use of any particularly surface active agent depends on the presence of a precise balance of surface active properties in the surfactant. The range of properties that can be obtained in the surfactants of Jackson et al. based on blocks of oxypropylene and oxyethylene chains has been significantly expanded by the present invention wherein the order of condensation of propylene oxide and ethylene oxide has been reversed.

Before discussing the new compositions and method of this invention in detail, it would be well to amplify the terms "mixtures," "conjugated" and "block" as used in this specification and in the appended claims to describe the compositions of the invention. It is well recognized in the field of alkylene oxide chemistry that when one subjects a reactive hydrogen compound to oxyalkylation, such as oxyethylation or oxypropylation, what is actually produced is a polymer of the alkylene oxide except for the terminal group. Furthermore, where the amount of the alkylene oxide employed is relatively large, one does not obtain a single molecular compound having a defined number of oxyalkylene radicals, but rather, one obtains a "mixture" of closely related homologues wherein the statistical average number of oxyalkylene groups equals the number of mols of the alkylene oxide employed and the individual members present in the mixture contain varying numbers of oxyalkylene groups. Thus, the compositions of this invention are "mixtures" of compounds which are defined by molecular weight and weight percent. When molecular weight is referred to in this specification and claims, there is meant the average theoretical molecular weight which equals the total of the grams of propylene oxide employed per mol of oxyethylene-reactive hydrogen compound condensate. In the examples of materials given herein according to the Jackson et al. patent, the theoretical molecular weight of the oxypropylene chain equals the total grams of propylene oxide per mol of reactive hydrogen compound.

The compositions of Jackson et al. and of this invention are such mixtures which are further defined as being "conjugated" or "block" polymers of alkylene oxides. Thus, compositions derived by condensing simultaneously about equal parts of ethylene oxide and propylene oxide, such as the lubricant compositions disclosed in Roberts et al., U.S. 2,425,755, are distinguished since in the latter case a heteric oxyethylene-oxypropylene chain is obtained wherein the different oxyalkylene groups are distributed randomly throughout the oxyalkylene chain. On the other hand, the compositions of this invention contain a block of oxyalkylene groups in a chain connected to a block of different oxyalkylene groups in a chain thus providing the conjugated or repeated unit structure which is necessary for hydrophobic and hydrophilic properties.

As has been noted hereinabove, the starting material for preparing the compositions of the invention is a low molecular weight reactive hydrogen compound. This fact is of the utmost importance in distinguishing the compositions of the invention from surface active agents of the prior art wherein alkylene oxides have been employed for various purposes. Jackson et al. disclose surface active compositions wherein the hydrophobic element derived its hydrophobic properties strictly from a defined oxypropylene chain. Compositions of the prior art wherein ethylene oxide is condensed with an initially water-insoluble, relatively high molecular weight and hydrophobic reactive hydrogen compound, or even where propylene oxide is initially condensed with such a starting material followed by oxyethylation, obviously cannot derive the hydrophobic characteristic necessary in a surface active agent from an oxyalkylene chain since such a characteristic is already provided by the starting material.

For example, U.S. 2,174,761 discloses surfactant compositions derived by condensing propylene oxide with cetyl alcohol and subsequently condensing ethylene oxide therewith. Cetyl alcohol and similar higher molecular weight reactive hydrogen compounds are sufficiently hydrophobic by themselves so that a surfactant is obtained merely by condensing ethylene oxide with such a reactive hydrogen compound and without employing any propylene oxide at all. Thus, the long hydrocarbon chain in cetyl alcohol supplies the hydrophobic characteristic for the surfactant and not a properly defined oxypropylene chain as set forth in the definitions of the compositions of this invention. So also in the compositions of this invention, the hydrophobic characteristic is directly attributable to the defined oxypropylene chain and the reactive hydrogen compound employed must not be sufficiently hydrophobic in itself so that a surfactant could be obtained merely by condensing a solubilizing amount of ethylene oxide therewith. If the latter type of reactive hydrogen compound were used, such as cetyl alcohol, flexibility of properties would be largely lost since the hydrophobic characteristic would be dominated by the starting material.

It will be noted that the starting material-reactive hydrogen compound generally has very little effect on the properties of the compositions of the invention, since by definition, the reactive hydrogen compound cannot be one which contributes significantly to the hydrophobic characteristic of the composition. This is true in spite of the fact that a major distinction from the prior art in the compositions of the invention lies in the fact that a hereindefined reactive hydrogen compound is employed as discussed above. The reactive hydrogen compound used in preparing the compositions of this invention and in carrying out the method of the invention must fulfill two conditions, initially:

(1) Its reactive hydrogen atom must be sufficiently labile to open the epoxide ring of ethylene oxide; and,
(2) The reactive hydrogen compound must react with methyl magnesium iodide to liberate methane in the classical Zerewitinoff reaction (See Niederl and Niederl, Micromethods of Quantitative Organic Analysis, page 263, John Wiley & Sons, New York city, 1946).

Furthermore, as stated hereinabove, the reactive hydrogen compound must be a relatively low molecular weight, water-soluble compound, such as one having up to about 6 carbon atoms, and must have only a single reactive hydrogen atom. It will be recognized, however, that a fairly broad range of reactive hydrogen compounds falls within this definition.

Thus, the lower molecular weight, monohydroxy alcohols constitute one class of reactive hydrogen compounds that is especially useful in preparing the compositions of this invention. Such alcohols can have up to about 6, inclusive, carbon atoms per molecule and examples of these materials are methanol, n-propanol, n-butanol, n-hexanol, methyl ether of ethylene glycol and phenol.

In this connection, it probably would be well to point out that the hydrogen atom in the hydroxyl radical attached to a tertiary carbon atom has been recognized as being unreactive with alkylene oxides, such as ethylene oxide and propylene oxide, under conventional base-catalyzed reaction conditions and so such compounds as tertiary butanol, alpha- or beta-terpineol are not reactive hydrogen compounds adaptable for use in preparing the compositions of the invention. Actually, tertiary butanol has been recommended in the prior art as a solvent for base-catalyzed alkylene oxide reactions because of its unreactivity therewith and we have found that alpha- and beta-terpineol do not react with ethylene oxide, or propylene oxide for that matter, under conventional base-catalysis conditions.

Another class of reactive hydrogen compounds that can be used is secondary amines, such as dimethylamine, diethylamine, morpholine, N-ethylbutylamine, dipropylamine, N-methylethylamine, N-ethylpropylamine, and the like. A further class of reactive hydrogen compounds is N-mono-substituted amides, such as methyl acetamide, N-propyl ethanesulfonamide, and the like. A still further class is monocarboxylic acids, such as acetic acid, butanoic acid, and the like. Still other such reactive hydrogen compounds can also be used so long as the particular compound meets the requirements set forth, i.e., relatively low molecular weight, reactivity with ethylene oxide and only a single reactive hydrogen atom.

The compositions of this invention are prepared by condensing a suitable reactive hydrogen compound with a defined weight of ethylene oxide to produce a polyoxyethylene glycol ether of the starting material, and subsequently condensing the thus produced polyoxyethylene glycol ether with propylene oxide so that the oxypropylene chain has a defined average molecular weight.

Since the reactive hydrogen compound has a single reactive hydrogen atom, the initially produced polyoxyethylene glycol ether corresponds to the structure, $$R(C_2H_4O)_nH$$ 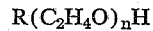

wherein R is the nucleus of the lower molecular weight reactive hydrogen compound having an oxyethylene chain attached thereto at the site of its reactive hydrogen atom and n has a value such such that the weight of the oxyethylene groups constitutes from about 20 to 90 weight percent of the final oxyethylene-oxypropylene composition. Thus, where n-propanol is the chosen reactive hydrogen compound, the structure of the initially produced propyl ether of polyoxyethylene glycol is simply,

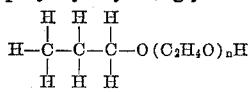

wherein $n$ has the value recited above.

The final composition of the invention is then produced by condensing propylene oxide with the propyl ether of polyoxyethylene glycol described above, and a sufficient quantity of propylene oxide is employed so that the molecular weight of the oxypropylene chain which is formed is at least about 371. The lower limit on the molecular weight of the oxypropylene chain is significant in that a molecular weight of about 371, which corresponds to about 6.4 oxypropylene groups in the chain, an oxypropylene chain attached to a reactive hydrogen compound having a single reactive hydrogen atom, in this case the propyl ether of polyoxyethylene glycol, changes from hydrophilic to hydrophobic. This is disclosed and demonstrated in the Jackson et al. patent, columns 17 and 18 and FIGURE 1. The molecular weight of the oxypropylene chain can be up to about 25,000 or more and useful surfactant compositions of this invention are obtained throughout this range.

Thus, the structure of a composition of this invention corresponds to the formula,

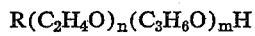

wherein R is the nucleus of the lower molecular weight reactive hydrogen compound, $n$ has a value such that the weight of the oxyethylene groups constitutes about 20 to 90 weight percent of the total oxyethylene-oxypropylene composition and $m$ has a value such that the molecular weight of the oxypropylene chain is at least about 371 and up to about 25,000.

The compositions of this invention have the most desirable combination of properties for use as detergents when the oxyethylene groups constitute about 25 to 75 weight percent of the total compositions, and wherein the molecular weight of the oxypropylene chain is about 1000 to 15,000, and compositions falling within these limitations are preferred by us for many uses.

Our invention set forth herein can also be stated in terms of the new method by which the compositions of the invention are prepared. The conditions and catalyst employed are those conventionally employed in alkylene oxide condensation reactions. However, our method which comprises condensing ethylene oxide with a relatively low molecular weight reactive hydrogen compound containing only a single reactive hydrogen atom to form a corresponding polyoxyethylene glycol ether, and thereafter condensing propylene oxide with said polyoxyethylene glycol ether, the amount of ethylene oxide employed being sufficient so that the polyoxyethylene glycol ether constitutes about 20 to 90 weight percent of the final composition and the amount of propylene oxide employed being sufficient so that the oxypropylene chain has an average molecular weight of about 371 to 25,000, is believed to express our invention in terms of the method steps employed.

As has been stated, the actual conditions employed in carrying out the alkylene oxide condensation reactions which are necessary in order to obtain the compositions and in order to carry out the method of the invention are well known in the art. The disclosure of Jackson et al. in U.S. 2,677,700, column 6, sets these conditions forth, and this disclosure in combination with the disclosure in our examples to follow describes the alkylene oxide reactions adequately. The compositions of this invention are particularly useful as detergents and tests which we have made on the compositions of the invention to show their usefulness as detergents include the Carbon Soil Removal Test, described in U.S. 2,677,700, column 14, lines 50–75, column 15, lines 1–75 and column 16, lines 1–6. The result of this test is a Carbon Soil Removal value taken at either 90° F. or 140° F. for the test composition which expresses its detergency in terms of its percentage effectiveness when compared to the standard 0.25% solution of sodium kerylbenzenesulfonate described in the test procedure. Other tests which we have made relate to the cloud point and foam height produced by the compositions under controlled conditions.

The cloud point test is carried out by heating a 10 weight percent solution of the test composition in distilled water in a test tube placed in a water bath. The water bath is gradually heated at a rate of about one degree a minute and so that the bath temperature is not more than 5–10 degrees centigrade higher than the test solution particularly near the cloud point. The test solution is agitated by a low-speed propeller-type stirrer and the cloud point observation of the test solution is made against a dark background. The cloud point is taken as the temperature at which definite milky striations or minute but discrete particles of a separate phase are observed.

The foam height test is carried out by placing 10 liters of a 0.10 weight percent solution of the test composition in tap water in a Pyrex glass jar measuring 10″ in diameter and 10″ in height. The Pyrex jar is equipped with a propeller-type stirrer, knife blade heaters, a thermoregulator and a thermometer. A small, centrifugal pump is arranged to circulate the solution in the jar through a calibrated glass flow meter to a jet orifice prepared from the base of a No. 20 Becton, Dickinson and Company hypodermic needle by enlarging the hole in the base with a No. 56 twist drill. The jet orifice is mounted coaxially inside a Pyrex glass tube (51 mm. by 910 mm.) which is placed vertically in the solution. The jet is arranged so that it is 600 mm. above the surface of the solution in the jar, and the Pyrex glass tube is arranged so as to project 210 mm. below the surface of the solution. The test solution is heated to and maintained at 120° F. The centrifugal pump is started and a flow rate of 200–400 ml. per minute of the solution is metered through the jet. The flow is adjusted by by-passing part of the solution stream back into the jar before passage through the flow meter. The solution passing through the jet is directed against the wall of the vertical tube while the flow is adjusted and while the temperature is brought to equilibrium in order to prevent foaming prior to the actual test. The jet is then arranged so as to pass the solution coaxially downward through the tube without touching the tube walls to impinge upon the surface of the solution located in the Pyrex tube. Time is measured from the instant the solution impinges on the liquid surface and the resulting foam is measured at the end of 10 minutes. The foam height readings are obtained from a calibration on the outside of the Pyrex tube with the zero mark at the surface of the solution and are expressed in millimeters.

We have found that the compositions of this invention have entirely different combinations of these three detergency properties, carbon soil removal value, cloud point and foam height, than the compositions of the Jackson et al. patent. Generally, the compositions of this invention have significantly lower cloud points and foam heights and these trends in combination with the distinctly different carbon soil removal values make our compositions a definite advance in the art since flexibility in properties of surfactants based on alkylene oxide block polymers is increased. These facts will become apparent from the examples which follow and particularly the direct comparisons of the properties of the compositions of the invention and the properties of the compositions of the Jackson et al. plant. The examples are supplied in order to exemplify the compositions and method of the invention and should not be employed to unduly limit the scope of our invention when due regard is given to the description given hereinabove and to follow.

EXAMPLES

A series of surfactant compositions was prepared employing reactive hydrogen compounds exemplary of the classes of such materials disclosed hereinabove in accordance with this invention. The procedure which exemplifies the method of this invention was generally the same throughout although variations in operating conditions and equipment were made to a certain extent in order to expedite the reactions and because of volume limitations dictated by the reactors employed.

The reactors employed were a one gallon, stainless steel autoclave equipped with a stirrer, thermocouple, pressure gage and reactant inlet tube whose outlet was directly under the stirrer; and, in some cases, a 3-necked glass flask equipped with a stirrer, condenser, thermometer and alkylene oxide inlet tube. The exact conditions, materials and weights of materials used are summarized in Table I below. In general, the reactive hydrogen compound and catalyst were initially charged into the reactor. The amount of catalyst charged to the reactor at the start of each stage is indicated in Table I and a dash (—) means that no additional catalyst was used. In the runs where N-methylmorpholine or water was used as a solvent-catalyst, the reactor was washed and dried following removal of the first stage product before charging KOH catalyst for the second and subsequent stages. Also, in those runs where N-methylmorpholine or water was used in the first stage, the product of the first stage was stripped at 100° C. and about 4 mm. Hg pressure for 1 hour before charging a portion of this product to the second stage.

Ethylene oxide was then admitted to the reactor while maintaining a reaction temperature in the range of 60–135° C. and average pressure of 1–95 p.s.i.g. The total reaction time varied from about 1–18 hours. Because of volume limitations imposed by the reactors, the polyoxyethylene glycol ether was made in stages, taking the indicated amount of the product of the first stage, charging it back into the reactor for further reaction with ethylene oxide as indicated. When the polyoxyethylene glycol ether having the desired weight of oxyethylene groups was obtained after reaction of the reactive hydrogen compound with ethylene oxide in 3 or 4 stages, the indicated amount of the intermediate polyoxyethylene glycol ether was then charged to the reactor together with KOH as catalyst and propylene oxide was then admitted under the indicated reaction conditions in the amount necessary to obtain an oxypropylene chain having the total theoretical molecular weight stated in the table. Compositions according to this invention were thus prepared and the reaction conditions are set forth below in Table I.

Table I
COMPOSITIONS OF INVENTION
[Summary of reaction conditions]

| Ex. No. | Reactive hydrogen compound (RHC) used | Amount RHC (or oxyalkylene condensate from previous stage) used, grams (mols) Stage | | | | Amount catalyst used, grams Stage | | | | Amount ethylene oxide (EO) or propylene oxide (PO) added, grams (mols) Stage | | | | Total reaction time, hours Stage | | | | Average temperature, °C Stage | | | | Average pressure, p.s.i.g. Stage | | | |
|---|---|---|---|---|---|---|---|---|---|---|---|---|---|---|---|---|---|---|---|---|---|---|---|---|---|
| | | A | B | C | D | A | B | C | D | A | B | C | D | A | B | C | D | A | B | C | D | A | B | C | D |
| 1 | n-Propanol | 450 (7.5) | A–736 (2.0) | B–440 (0.4) | ---- | (a) 49.5 | — | — | | EO–2312 (52.6) | EO–1764 (40.0) | PO–1267 (21.8) | ---- | 4.8 | 4.4 | 6.2 | ---- | 125 | 125 | 125 | ---- | 20 | 14 | 50 | -- |
| 2 | do | 450 (7.5) | A–736 (2.0) | B–450 (0.4) | ---- | (a) 49.5 | — | — | | EO–2312 (52.6) | EO–1764 (40.0) | PO–864 (14.9) | ---- | 4.8 | 4.4 | 4.4 | ---- | 125 | 125 | 125 | ---- | 20 | 14 | 35 | -- |
| 3 | n-Hexanol | 400 (3.9) | A–900 (1.6) | B–900 (0.6) | ---- | (a) 36.6 | — | — | | EO–1755 (40.0) | EO–1390 (31.6) | PO–1800 (31.1) | ---- | 6.1 | 4.0 | 6.0 | ---- | 125 | 125 | 125 | ---- | 40 | 50 | 55 | -- |
| 4 | Diethylamine [1] | 240 (3.3) | A–400 (3.4) | B–595 (1.0) | C–700 (0.5) | (b) 50.0 | (a) 32.0 | — | | EO–145 (3.3) | EO–1635 (37.2) | EO–905 (20.6) | PO–1400 (31.8) | 6.0 | 7.8 | 3.7 | 4.4 | 50 | 135 | 125 | 125 | 2 | 75 | 76 | 45 |
| 5 | Morpholine | 284 (3.3) | A–330 (2.5) | B–628 (0.7) | C–655 (0.3) | (b) 60.0 | (a) 23.6 | — | | EO–148 (3.3) | EO–1940 (44.0) | EO–977 (22.2) | PO–1324 (22.8) | 3.8 | 10.1 | 5.2 | 6.2 | 90 | 135 | 125 | 125 | 2 | 85 | 45 | 55 |
| 6 | Acetic acid | 340 (6.7) | A–600 (1.5) | B–650 (0.5) | ---- | (d) 109.0 | — | — | | EO–2207 (50.1) | EO–1350 (30.7) | PO–1300 (22.4) | ---- | 8.3 | 5.3 | 4.8 | ---- | 135 | 125 | 125 | ---- | 75 | 45 | 65 | -- |

[1] Diethylaminoethanol actually used as reactive hydrogen compound beginning in Stage B. Stage A of Example 4 illustrates use of diethylamine in initial condensation with ethylene oxide.

NOTE.—Catalysts: (a) Potassium hydroxide (85%), (b) water, (c) N-methylmorpholine, (d) potassium acetate.

Thus, Table I above summarizes the conditions under which surfactant compositions according to the present invention were prepared. These compositions are summarized in Table II below which reports the reactive hydrogen compound used, the weight percent of the total composition attributable to the oxyethylene groups and the total theoretical molecular weight of the oxypropylene chain. Since these compositions were prepared in stages, the examples are identified by Example No. and Stage B, C, D, etc. which stand for the preparation of the particular composition.

Table II
COMPOSITIONS OF INVENTION

| Example No. and Stage | Reactive hydrogen compound | Oxyethylene groups, weight percent | Oxypropylene chains, molecular weight |
|---|---|---|---|
| 1–C | n-Propanol | 25.8 | 3,600 |
| 2–C | do | 34.3 | 2,400 |
| 3–C | n-Hexanol | 32.6 | 2,800 |
| 4–D | Diethylamine | 32.8 | 3,000 |
| 5–D | Morpholine | 32.9 | 4,000 |
| 6–C | Acetic acid | 32.8 | 2,600 |

A parallel series of surfactant compositions according to the Jackson et al. patent, U.S. 2,677,700, was also prepared wherein the reactive hydrogen compound was initially condensed with propylene oxide and the thus produced polyoxypropylene glycol ether was then condensed with ethylene oxide. These compositions were prepared with the proper amount of propylene oxide and ethylene oxide so that the weight percent oxyethylene groups and molecular weight of the oxypropylene chain were the same as these values present in the compositions according to this invention summarized above in Tables I and II. Thus, direct comparisons were then possible and were made so as to demonstrate the difference in detergency properties between the compositions of the invention and the compositions of the Jackson et al. patent.

The compositions according to the Jackson et al. patent were prepared in stages following the same general procedure and with the same equipment as that already described for the compositions of the invention summarized in Tables I and II. The significant difference from the method employed in the examples recorded in Tables I and II is, of course, that the reactive hydrogen compound was initially condensed with propylene oxide in the examples in Table III rather than ethylene oxide in accordance with this invention. The preparation of the compositions of the Jackson et al. patent is summarized below in Table III.

*Table IV*

| Example No. and Stage | Reactive hydrogen compound | Oxypropylene chains, molecular weight | Oxyethylene groups, weight percent |
|---|---|---|---|
| 9—D | n-Propanol | 3,600 | 25.8 |
| 10—C | do | 2,400 | 34.3 |
| 11—C | n-Hexanol | 2,800 | 32.6 |
| 12—D | Diethylamine | 3,000 | 32.8 |
| 13—D | Morpholine | 4,000 | 32.9 |
| 14—C | Acetic acid | 2,600 | 32.8 | procedures previously set forth for these tests. The results of these comparison tests are set forth below in Table V.

*Table III*

COMPOSITIONS OF JACKSON ET AL. (U.S. 2,677,700)

[Summary of reaction conditions]

| Ex. No. | Reactive hydrogen compound (RHC) used | Amount RHC (or oxyalkylene condensate from previous stage) used, grams (mols) | | | | Amount catalyst used, grams | | | | Amount propylene oxide (PO) or ethylene oxide (EO) used, grams (mols) | | | | Total reaction time, hours | | | | Average temperature, °C. | | | | Average pressure, p.s.i.g. | | | |
|---|---|---|---|---|---|---|---|---|---|---|---|---|---|---|---|---|---|---|---|---|---|---|---|---|---|
| | | Stage | | | | Stage | | | | Stage | | | | Stage | | | | Stage | | | | Stage | | | |
| | | A | B | C | D | A | B | C | D | A | B | C | D | A | B | C | D | A | B | C | D | A | B | C | D |
| 9 | n-Propanol | 420 (7.0) | A– 450 (1.1) | B– 1200 (0.5) | C– 900 (0.3) | (a) 46.2 | — | — | — | PO– 2380 (41.0) | PO– 2250 (38.8) | PO– 600 (10.4) | EO– 312 (7.1) | 5.9 | 6.0 | 3.1 | 2.2 | 125 | 125 | 125 | 125 | 10 | 85 | 50 | 75 |
| 10 | do | 420 (7.0) | A– 450 (1.1) | B– 600 (0.3) | — | (a) 46.2 | — | — | — | PO– 2380 (41.0) | PO– 2250 (38.8) | EO– 313 (7.1) | — | 5.9 | 6.0 | 2.4 | — | 125 | 125 | 125 | — | 10 | 85 | 70 | — |
| 11 | n-Hexanol | 400 (3.9) | A– 500 (0.7) | B– 1100 (0.4) | — | (a) 36.6 | — | — | — | PO– 2345 (40.5) | PO– 2000 (34.5) | EO– 550 (12.5) | — | 6.9 | 6.1 | 3.0 | — | 125 | 125 | 125 | — | 20 | 60 | 50 | — |
| 12 | Diethylamine | 240 (3.3) | A– 250 (1.9) | B– 700 (0.7) | C– 900 (0.3) | (b) 50.0 | (a) 17.9 | — | — | PO– 191 (3.3) | PO– 1660 (28.6) | PO– 1635 (28.2) | EO– 450 (10.3) | 6.5 | 6.5 | 6.1 | 2.0 | 50 | 135 | 125 | 125 | 2 | 50 | 50 | 50 |
| 13 | Morpholine | 290 (3.3) | A– 400 (2.8) | B– 502 (0.5) | C– 900 (0.2) | (b) 61.0 | (a) 25.8 | — | — | PO– 193 (3.3) | PO– 2360 (40.6) | PO– 1500 (25.9) | EO– 450 (10.2) | 6.8 | 7.3 | 7.8 | 3.0 | 60 | 100 | 125 | 125 | 2 | 35 | 60 | 75 |
| 14 | Acetic acid | 340 (6.7) | A– 400 (1.1) | B– 800 (0.3) | — | (d) 109.0 | — | — | — | PO– 2400 (41.5) | PO– 2075 (35.7) | EO– 400 (9.1) | — | 8.8 | 7.9 | 2.0 | — | 125 | 125 | 125 | — | 60 | 70 | 85 | — |

NOTE.—Catalysts: (a) Potassium hydroxide (85%), (b) water, (c) N-methylmorpholine, (d) potassium acetate.

The compositions of the Jackson et al. patent which were prepared in order to make direct comparisons with the compositions of the invention are summarized below in Table IV showing the reactive hydrogen compound used, the molecular weight of the oxypropylene chain and the weight percent of each composition attributable to the oxyethylene groups.

Compositions according to this invention summarized in Table II and compositions according to the Jackson et al. patent summarized in Table IV were tested for detergency as reflected by their carbon soil removal values as well as for cloud points and foam heights according to the It will be apparent from a review of the data recorded in Table V that the major objective of this invention has been accomplished. That is, flexibility in the properties of surface active agents based on block polymers of propylene oxide and ethylene oxide has been significantly increased by our concept of initially condensing ethylene oxide with a relatively low molecular weight reactive hydrogen compound having only a single reactive hydrogen atom and then condensing propylene oxide with the initially produced polyoxyethylene glycol ether. The tests made and results thereof which are recorded in Table V show unmistakably that the compositions of this invention

*Table V*

COMPARISON OF DETERGENCY, FOAM HEIGHT AND CLOUD POINT PROPERTIES BETWEEN COMPOSITIONS OF INVENTION AND COMPOSITIONS OF JACKSON ET AL. PATENT (U.S. 2,677,700)

| Ex. No. | Reactive hydrogen compound | Composition of invention | | Composition of Jackson et al. patent | | Carbon soil removal value at— | | Foam height, mm. | Cloud point, °C. |
|---|---|---|---|---|---|---|---|---|---|
| | | Oxyethylene groups, weight percent | Oxypropylene chains, molecular weight | Oxypropylene chains, molecular weight | Oxyethylene groups, weight percent | 90 °F. | 140° F. | | |
| 1 | n-Propanol | 25.8 | 3,600 | | | 122 | 229 | 6 | 11.5 |
| 9 | do | | | 3,600 | 25.8 | 173 | 132 | 70 | 22.0 |
| 2 | do | 34.3 | 2,400 | | | 95 | 244 | 7 | 12.5 |
| 10 | do | | | 2,400 | 34.3 | 226 | 170 | >600 | 41.0 |
| 3 | n-Hexanol | 32.6 | 2,800 | | | 146 | 216 | 30 | 7.2 |
| 11 | do | | | 2,800 | 32.6 | 169 | 124 | 455 | 53.0 |
| 4 | Diethylamine | 32.8 | 3,000 | | | 214 | (¹) | 55 | 11.0 |
| 12 | do | | | 3,000 | 32.8 | 223 | 198 | ² 445 | 50.0 |
| 5 | Morpholine | 32.9 | 4,000 | | | 223 | 150 | 40 | 10.0 |
| 13 | do | | | 4,000 | 32.9 | 291 | 308 | ² 130 | 41.5 |
| 6 | Acetic acid | 32.8 | 2,600 | | | 118 | 187 | 9 | 12.5 |
| 14 | do | | | 2,600 | 32.8 | 138 | 267 | 125 | 38.5 |

¹ Not Determined.   ² Flow rate was 300 ml./min.

have distinctly different properties than the compositions of the Jackson et al. patent wherein the relatively low molecular weight reactive hydrogen compound is initially condensed with propylene oxide and the thus produced polyoxypropylene glycol ether is then condensed with ethylene oxide. Furthermore, definite trends can be seen upon close review of the data in Table V. Cloud point is consistently lower and foam height is consistently lower with the compositions of this invention. Detergency as measured by the carbon soil removal test varies; in some cases the compositions of the invention produced significantly higher carbon soil removal values than did the compositions of the Jackson et al. patent, e.g., Examples 1, 2, and 3 compared at 140° F. to Examples 9, 10 and 11, respectively, while in other cases the compositions of the Jackson et al. patent produced higher carbon soil removal values. In any case, an entirely different composition from the point of view of chemical and physical properties is produced according to the concept of this invention. The comparisons are made, it should be noted, between pairs of compositions where essentially the same amounts of the same ingredients were used with sole significant difference residing in the molecular structure which results from the order in which propylene oxide and ethylene oxide were used in making the compositions.

What is claimed is:

1. A surface active mixture of conjugated polyoxyalkylene compounds, said compounds consisting of a chain of oxyethylene groups, a chain of oxypropylene groups and the nucleus of a reactive hydrogen compound, said reactive hydrogen compound having up to and including 6 carbon atoms per molecule and having only a single reactive hydrogen atom and being selected from the group consisting of monohydroxy alkanols in which the hydroxyl group is attached to a primary carbon atom, monohydroxy alkanols in which the hydroxyl group is attached to a secondary carbon atom, secondary dialkylamines, monocarboxylic alkanoic acids, phenol, methyl ether of ethylene glycol, N-propylethanesulfonamide, methyl acetamide and morpholine, the structure of said compounds being that one end of said chain of oxyethylene groups is attached to the nucleus of the reactive hydrogen compound at the site of the reactive hydrogen compound's reactive hydrogen atom and one end of said chain of oxypropylene groups is attached to the other end of said chain of oxyethylene groups, the average molecular weight of said chain of oxypropylene groups being in the range of 371 to about 25,000 and the weight of said chain of oxyethylene groups constituting from about 20 to 90 weight percent of the weight of said surface active mixture of polyoxyalkylene compounds.

2. A mixture of surface active polyoxyalkylene compounds according to claim 1 wherein the average molecular weight of the chain of oxypropylene groups is in the range of 1000 to 15,000.

3. A mixture of surface active polyoxyalkylene compounds according to claim 2 wherein the reactive hydrogen compound is n-propanol.

4. A mixture of surface active polyoxyalkylene compounds according to claim 2 wherein the reactive hydrogen compound is methanol.

5. A mixture of surface active polyoxyalkylene compounds according to claim 2 wherein the reactive hydrogen compound is n-butanol.

6. A mixture of surface active polyoxyalkylene compounds according to claim 2 wherein the reactive hydrogen compound is dimethylamine.

7. A mixture of surface active polyoxyalkylene compounds according to claim 2 wherein the reactive hydrogen compound is diethylamine.

8. A method for preparing a mixture of surface active, conjugated polyoxyalkylene compounds, which comprises, condensing ethylene oxide with a reactive hydrogen compound, said reactive hydrogen compound having up to and including 6 carbon atoms per molecule and having only a single reactive hydrogen atom and being selected from the group consisting of monohydroxy alkanols in which the hydroxyl group is attached to a primary carbon atom, monohydroxy alkanols in which the hydroxyl group is attached to a secondary carbon atom, secondary dialkylamines, monocarboxylic alkanoic acids, phenol, methyl ether of ethylene glycol, N-propylethanesulfonamide, methyl acetamide and morpholine, to produce a polyoxyethylene glycol ether of said reactive hydrogen compound, and then condensing propylene oxide with said polyoxyethylene glycol ether, the amount of propylene oxide used being such that the molecular weight of the compounds attributable to oxypropylene groups is from 371 to 25,000 and the amount of ethylene oxide used being such that the weight of the oxyethylene groups constitutes from 20 to 90 weight percent of the weight of the mixture of compounds.

References Cited in the file of this patent

UNITED STATES PATENTS

| | | |
|---|---|---|
| 2,549,438 | De Groote et al. | Apr. 17, 1951 |
| 2,549,439 | De Groote et al. | Apr. 17, 1951 |
| 2,574,540 | De Groote et al. | Nov. 13, 1951 |
| 2,574,542 | De Groote et al. | Nov. 13, 1951 |
| 2,677,700 | Jackson et al. | May 4, 1954 |
| 2,791,567 | Lowe et al. | May 7, 1957 |